(12) United States Patent
Kempf (10) Patent No.: US 8,875,636 B2
(45) Date of Patent: Nov. 4, 2014

(54) UNIVERSAL POWERPACK AND ATTACHMENTS

(75) Inventor: James Kempf, WallKill, NY (US)

(73) Assignee: Production Resource Group, LLC, New Windsor, NY (US)

( * ) Notice: Subject to any disclaimer, the term of this patent is extended or adjusted under 35 U.S.C. 154(b) by 388 days.

(21) Appl. No.: 13/447,170

(22) Filed: Apr. 14, 2012

(65) Prior Publication Data

US 2012/0260754 A1    Oct. 18, 2012

Related U.S. Application Data

(60) Provisional application No. 61/475,498, filed on Apr. 14, 2011.

(51) Int. Cl.
| | | |
|---|---|---|
| *B61B 3/00* | (2006.01) | |
| *F16H 19/06* | (2006.01) | |
| *B66C 13/30* | (2006.01) | |
| *B66F 9/07* | (2006.01) | |

(52) U.S. Cl.
CPC ............... *B66F 9/072* (2013.01); *F16H 19/06* (2013.01); *B66C 13/30* (2013.01)
USPC .............................................. 104/95; 104/89

(58) Field of Classification Search
USPC ............... 104/89–95, 290; 74/89.2, 89.22, 89
See application file for complete search history.

(56) References Cited

U.S. PATENT DOCUMENTS

| | | | | |
|---|---|---|---|---|
| 3,518,947 | A * | 7/1970 | Borst | 105/30 |
| 3,774,548 | A * | 11/1973 | Borst | 105/30 |
| 4,856,270 | A * | 8/1989 | Langen et al. | 57/281 |
| 5,020,440 | A * | 6/1991 | Ohara et al. | 104/127 |
| 5,461,985 | A * | 10/1995 | Gersemsky | 105/30 |
| 7,021,510 | B2 * | 4/2006 | Ellingson | 226/172 |
| 8,191,481 | B2 * | 6/2012 | Spangler et al. | 104/89 |
| 8,397,644 | B2 * | 3/2013 | Aschauer et al. | 105/141 |
| 2003/0079641 | A1 * | 5/2003 | Johnson et al. | 104/165 |

* cited by examiner

*Primary Examiner* — Jason C Smith
(74) *Attorney, Agent, or Firm* — Law Office of Scott C. Harris, Inc.

(57) ABSTRACT

A reconfigurable power pack, that produces rotational power and can be used with separate accessories. The housing can be mounted in a first configuration with its motor facing downward and in which the housing is energized to move along a substantially horizontal extrusion. A second configuration mounts the housing is to move along a track in a deck. Other configurations are also possible.

7 Claims, 14 Drawing Sheets

UNIVERSAL POWERPACK AND ATTACHMENTS

This application claims priority from 61/475,498, filed Apr. 14, 2011, the entire contents of which are herewith incorporated by reference.

BACKGROUND

Traditionally, companies have fabricated and stocked a wide array of moving machines each designed to actuate a very specific effect type. Only a few machines, mostly basic cable winches, have seen broad use for a variety of applications while many others see only occasional use. The most costly parts of those machines are the motor, gearbox, and feedback, which exist in each stock machine and also get repackaged for each new custom effect.

SUMMARY

The present application describes a modular base module that acts as a universal powerpack for a number of different movable modules. The different movable modules are also described herein. Each of the movable modules are referred to as accessory modules. The modules mate with the base module, and are driven by the base module.

The inventor recognizes that it will be advantageous in the future to have a stock power pack module that can include any or all of a motor, gearbox, and feedback in a compact reusable package able to mate with accessory modules to transform into many varied machines. Instead of having a large stock of $7,000 specialty machines that might only see intermittent usage, we could have a stock of $4,500 power packs that couple to various $2,500 accessories to meet a broad range of low to medium duty applications. That way, the most expensive parts would be in constant reuse, requiring less capital investment and very little storage space.

BRIEF DESCRIPTION OF THE DRAWINGS

FIG. 2 and three show respective views of the powerpack assembly, where

DETAILED DESCRIPTION

Figure 1:
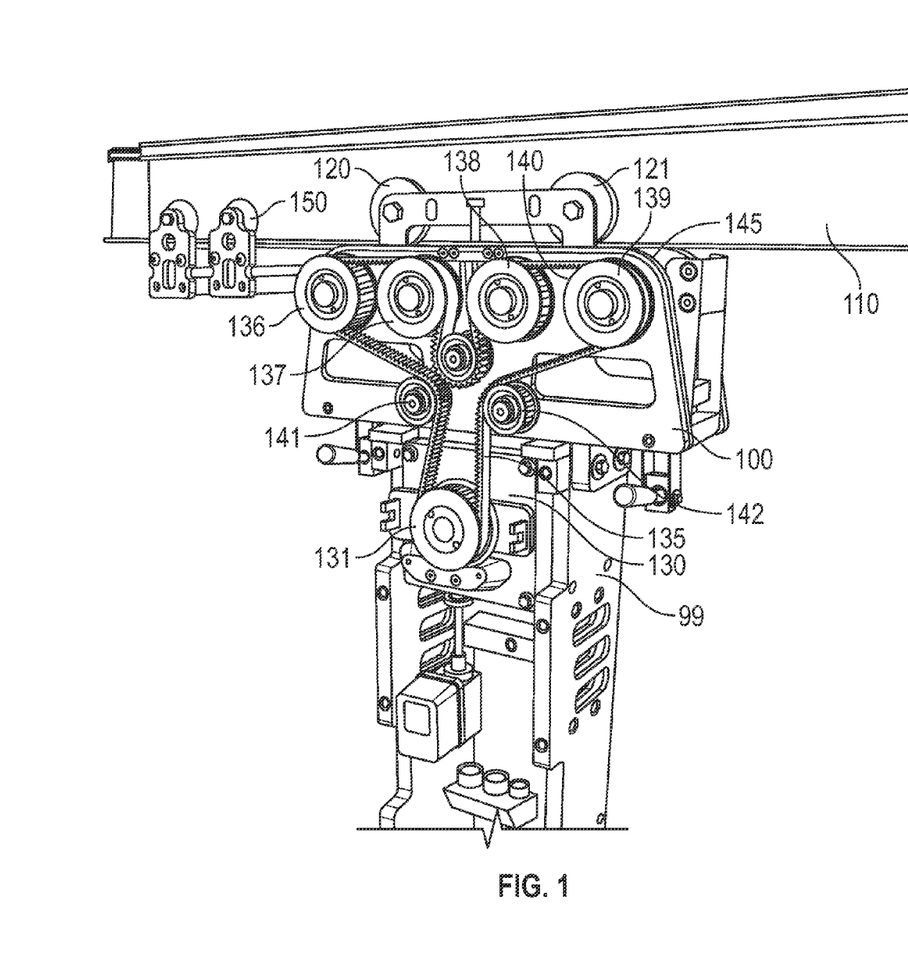
FIG. 1 shows a perspective view of the system when configured in a first mode in which it moves along a track.

FIG. 1 illustrates a first embodiment in which the power pack module 100 is shown attached to an overhead I-beam 110, also referred to as an extrusion. The power pack module includes driving wheels 120, 121 which drive it along the I-beam. There is also a motor 130 with a capstan output 131 that connects via a belt 135 to provide the driving to a number of driving wheels 136, 137, 138 and 139. These driving wheels have toothed inner surfaces such as 140 which receive the drive belt 135 thereon via idlers 141 and 142. The driving wheels 136-139 may be connected to inner drive mechanisms such as 145 that drive the device 100 relative to the supporting beam.

In one embodiment, there may also be a trolley assembly shown as 150 that is either connected to the powerpack 100, or pushed/pulled by the powerpack 100.

These new machines can be connected to devices that cover the range of effects requiring 2.5 hp or less. This can be used in various devices intended specifically for the concert touring, theatrical touring, and corporate events markets where package size, modularity, and speed of installation are critical. These could also be used for basic effects in the Broadway market. The power packs can drive the multitude of effects broken out separately below. These devices are intended for, therefore, low duty effects.

The unit revolves around a base "PTO—power takeoff" Module. This is formed of an Allen Bradley MPL-A420P AC servo motor with integral brake and absolute encoder coupled to an Alpha VDH050 16:1 worm gearbox driving a Martin 3" diameter pulley for Goodyear/Gates 8 mm pitch 21 mm wide HTB belting. Also on the gearbox shaft is a Martin L037 belt loop driving a TER 100:1 rotary limit box. The mechanical components are housed in a weld-less, CNC cut, and machined aluminum plate box with threaded inserts on all sides for attaching accessories and for attaching to supports of various types such as trusses etc. The device has an exemplary Length 19", width 8.5", height 6", weight 54 lbs.

The base module is a complete machine in itself that can be used to drive belt loop actuated deck and traveler tracks with minor accessories noted below.

The tug drive module—as shown in FIG. 1 attached to the base module 99 is a machine that self-drives along horizontal extrusion tracks 110 (which can be, for example, I beam tracks) to pull/push soft goods, scenic panels, lift winches, or LED panels. The module is fed power and control by mini festoon trolleys that also act as soft goods carriers and can also carry cabling for LED panels or other automated effects. (Length 18", width 6.5", height 14", weight approx. 25 lbs)

Other modules include a Grooved drum module—a 3/16" cable drum bearing mounted between two cheek plates with cable keepers, drive pulley, and walking sheaves that mates to the base module with an HTB belt loop. The resulting cable winch is very similar to the PRG Tracker narrow traveler winch in size and performance. The winch can be used to drive traveler tracks, deck tracks, counterweight assist flies, soft goods tabs, and a wide variety of light to medium duty cable winch effects. (length 20", width 6.75", height 19", weight approx. 50 lbs)

A Turntable drive module—a 12" soft rubber wheel in a bearing mount is connected to the base module with an HTB belt loop and used to rim drive stock PRG turntables. The base module and wheel are mounted to a spring loaded sled to apply constant torque to the table no matter how out of round. (length 24.5", width 27", height 7.75", weight approx. 40 lbs)

A Capstan drum module—a 12" diameter roller with 24" diameter cheeks used to move soft goods at high speeds ranging from 8 to 14 fps depending on wrap. The drum is connected to the base module with an HTB belt loop and both are contained in a welded aluminum traveling frame on casters that mates to a variety of stock trusses. Length 32", width 32", height 32", weight approx. 75 lbs)

A Roll down modular system—a new configurable system consisting of custom 10" rollers in stock 10', 8', and 5' lengths to align with 12" box truss strong backs capped by custom bearing end plates. The base module can mount to either end plate to drive roll downs from 5' to 32' long.

Two-post lift modular system—a new configurable system that has a bottom drive shaft module with brakes and encoder, a top idler module, a cantilevered carriage, and various spacer frames/platforms to create a wide variety of lift travels and sizes. The bottom drive shaft is driven by a HTB belt loop from the base module mounted one of in eight possible locations.

Roller chain drives—Replace the base unit HTB pulley with a #40-50 roller chain sprocket and the base unit can be used to drive a variety of custom PRG effects such as chain tracks, rover steering/drives, small treadmills, sloats, push chain drives, etc.

An Acrylic deck cover—a 1" CNC cut acrylic cover fastened over the base module when it is mounted in a touring deck platform when driving belt deck tracks.

A Cable tail bracket—an ⅛" CNC cut and folded steel bracket for dressing the motor/feedback tails with the tug module or possibly other applications.

A Soft goods overlap arm—a pair of CNC cut steel plates mounted to the base module with the tug module for creating a soft goods overlap at the center of tracks.

Mini-festoon/soft good carrier—a new trolley to carry soft goods on PRG extrusion track and also to feed the base module when used with the tug module.

Figure 2:
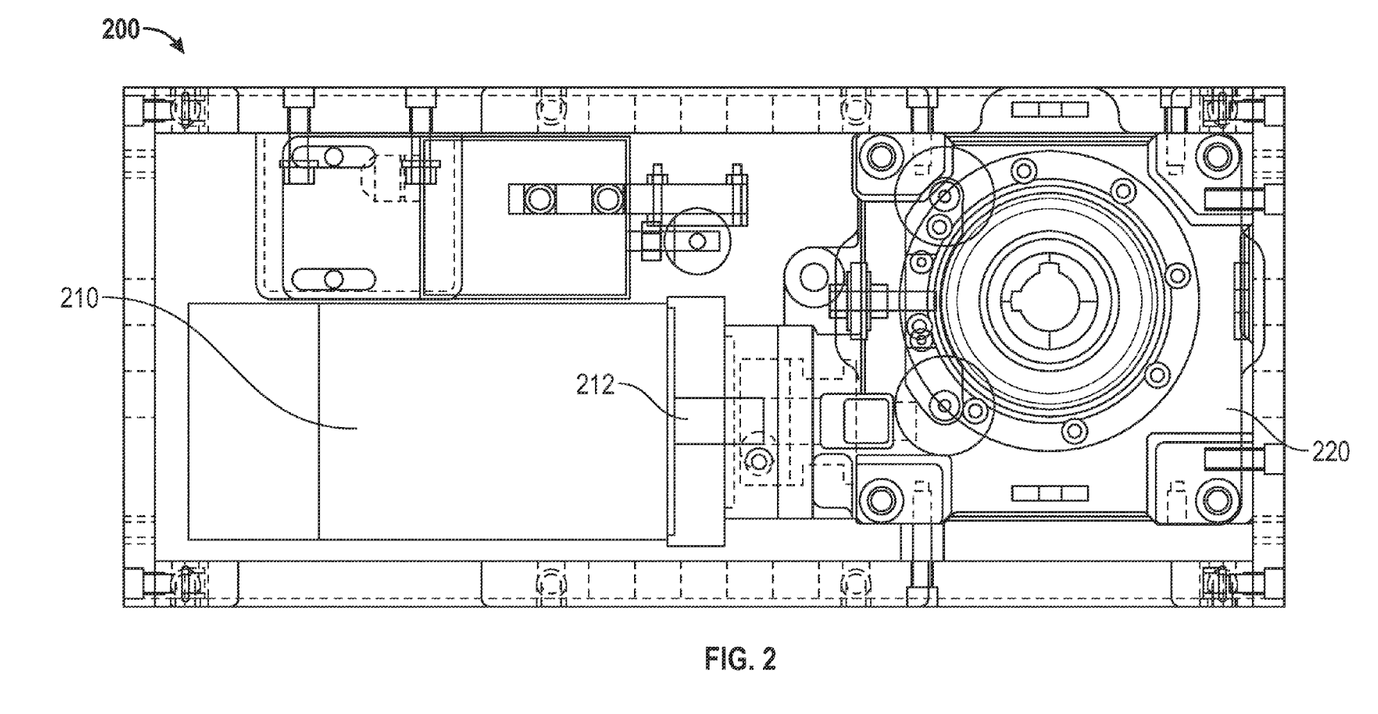
FIG. 2 shows a plan view of the base module.
Figure 3:
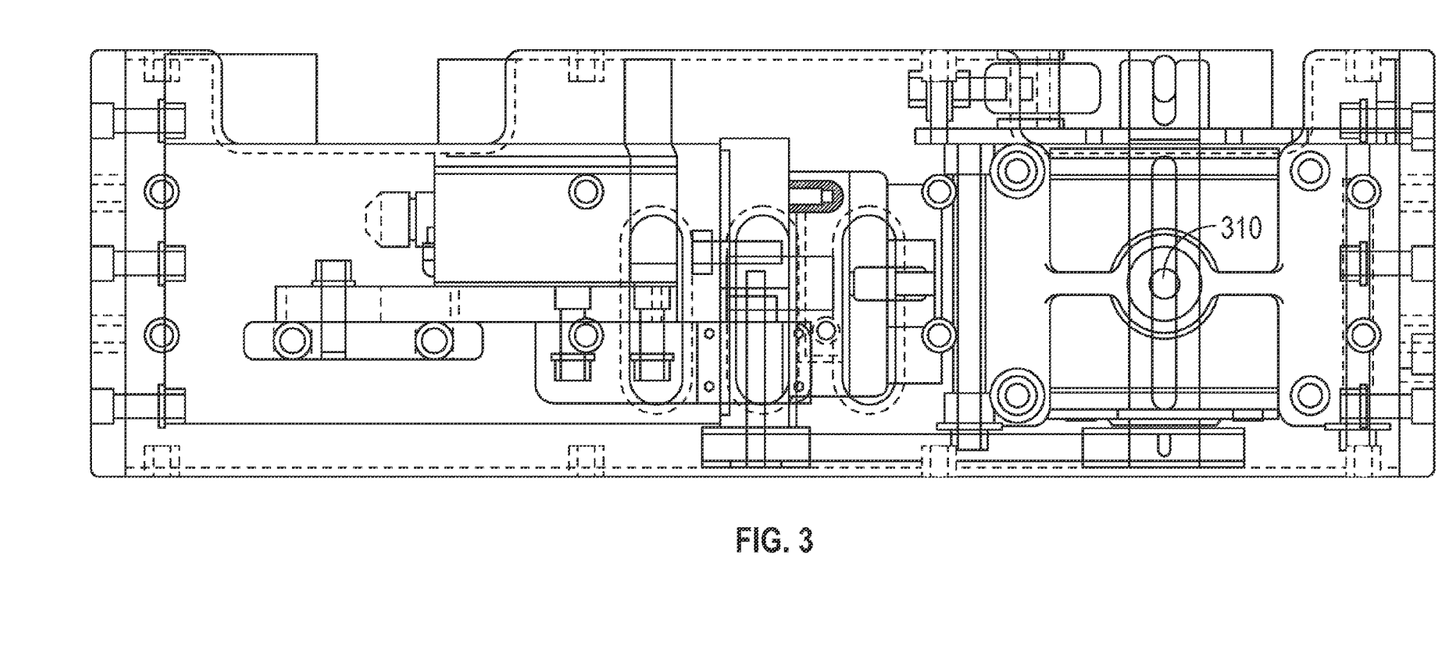
FIG. 3 shows a front view of the base module.

The powerback, also called base, module itself is shown in FIGS. 2 and 3, where FIG. 2 shows a plan view of the base module, and FIG. 3 shows a front view of the base module. The device includes a housing 200 for example formed of ¾ inch aluminum plates that are bolted together. The housing holds a servomotor 210 that carries out the basic functions of the system. In one embodiment the servomotor may be an Allen Bradley mpl-a420p servomotor. The outlet of the servomotor 212 is connected to a worm style gearbox 220, for example an Alpha VDH050 16 to 1 worms style gearbox. The gearbox has a gearbox shaft shown as 310 in FIG. 3, which may for example be a hexagonal shaped shaft that produces output rotational force. As shown in FIGS. 2 and 3, the basic device is rectangular, with the motor 210 at one end of the housing, intended to be facing downward as shown in 99 when in a hanging embodiment. In that embodiment the weight of the motor 210 holds that end of the housing in the downward position at least in one embodiment where the device is hanging as shown in FIG. 1.

Figure 4:
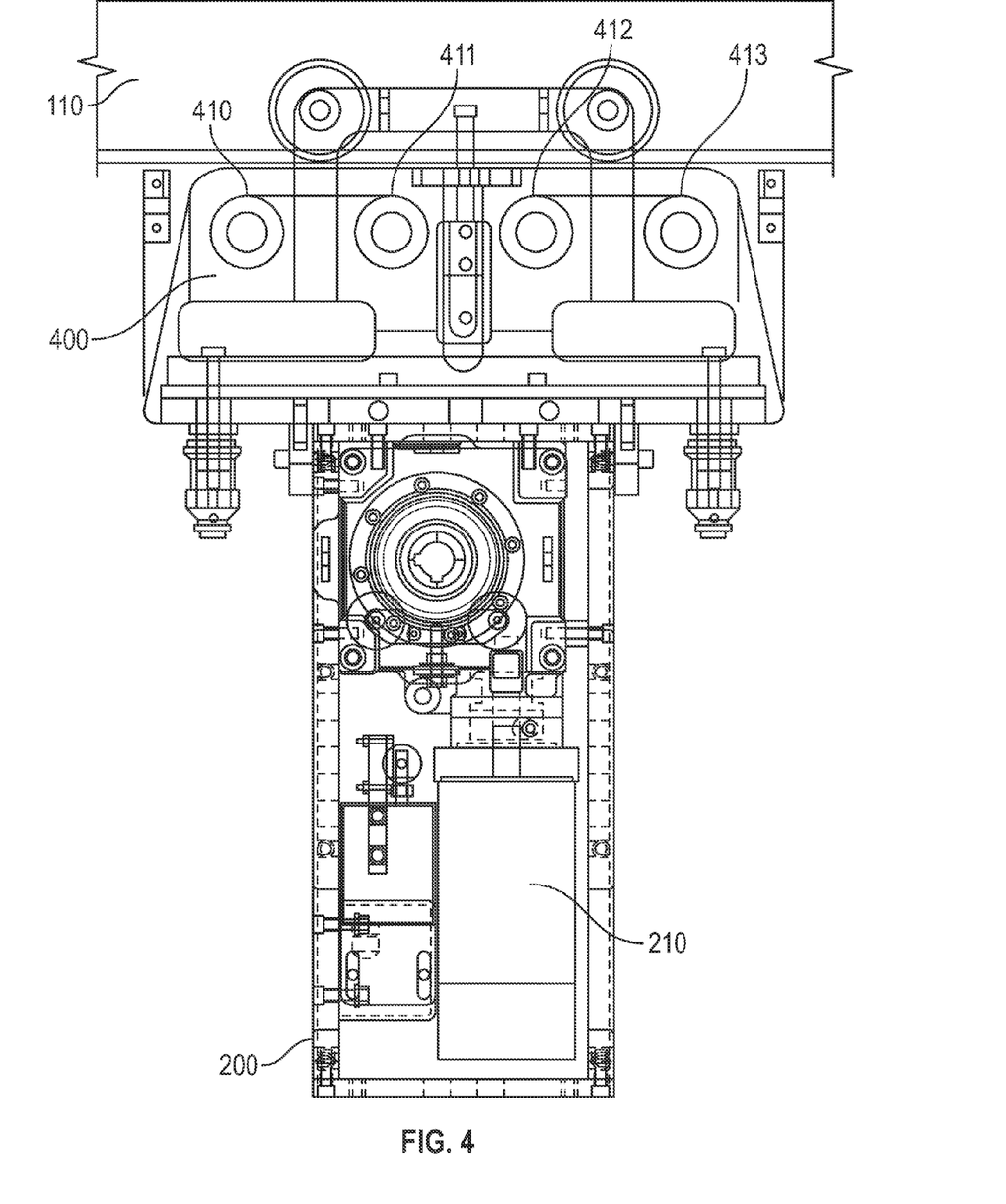
FIGS. 4 and 5 shows a side on view of the power pack assembly in the first embodiment.

The base module 200 can be connected to a number of different secondary modules to allow the different functions. FIG. 1 shows the base module connected to an assembly, which is shown in more detail in FIG. 4. In this embodiment, the power pack drives via a belt or chain drive 400, and a number of driven wheels shown generally as 410, 411, 412, 413. These driven wheels have their surface against a bottom surface of an extrusion track 110. For example, the extrusion track may be that shown in our co-pending application Ser. No. 12/749,352, filed Mar. 29, 2010. This allows driving the device in a winch style along that extrusion track.

Figure 5:
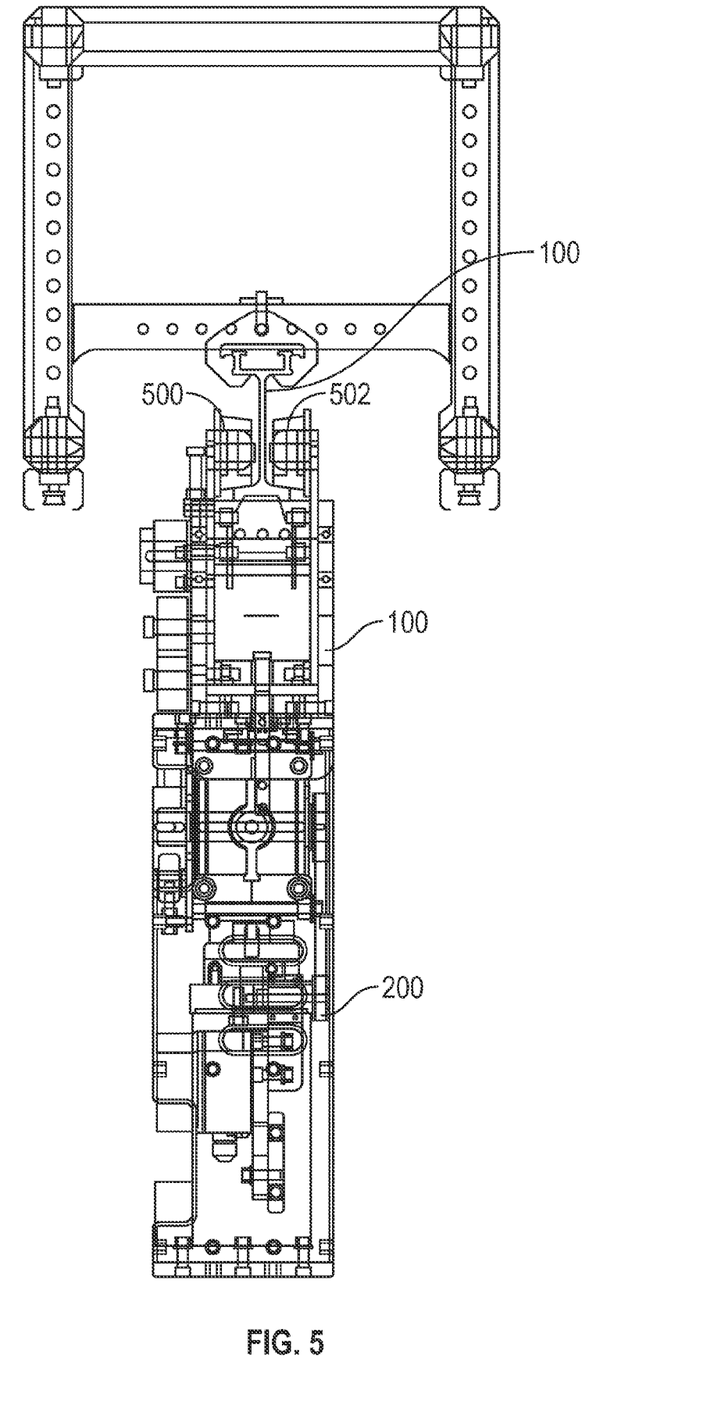

FIG. 5 shows a side view in which the tug assembly 100 connected to the power pack 200 is driven along the extrusion track 110 using rollers 500, 502 that are opposite be placed on opposite sides of the extrusion track.

Figure 6:
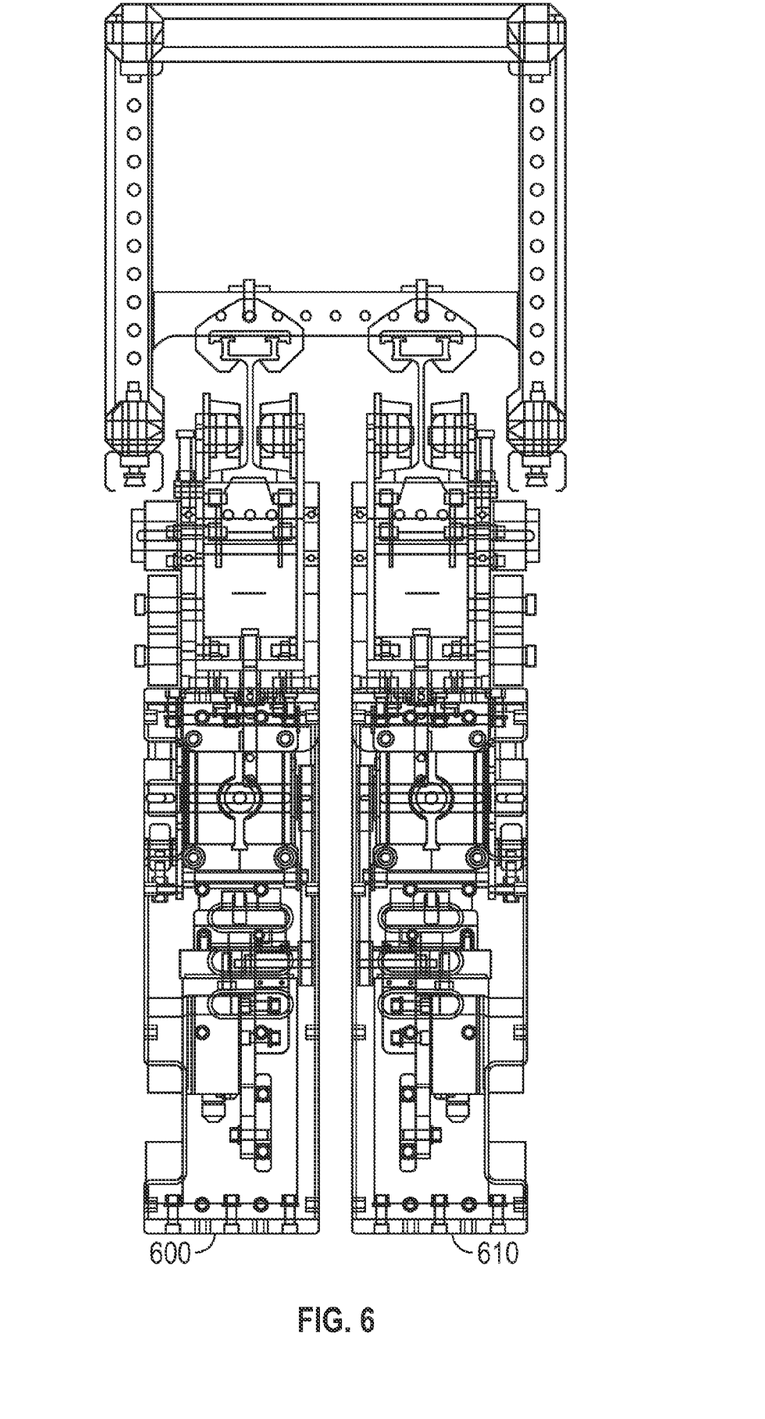
FIG. 6 shows the embodiment of FIG. 5 configured to use to power packs hanging from the same truss.

FIG. 6 illustrates an embodiment where there are two tugs/tractors 600 and 610 on two parallel tracks. In this embodiment, the tractors can pass in either direction relative to one another.

Figure 7:
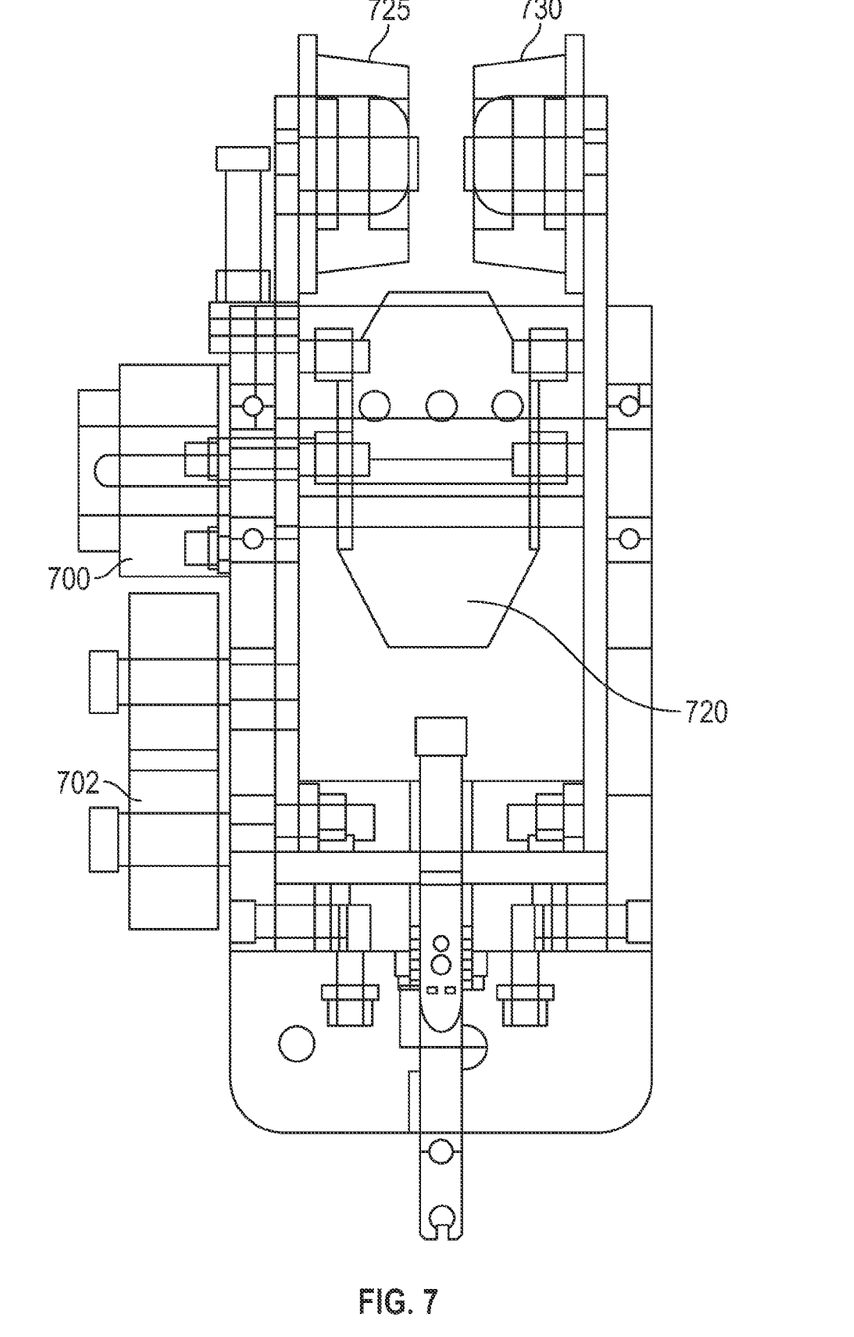
FIG. 7 shows a trolley that can be used with the first embodiment.

FIG. 7 shows a side view of the tug assembly, showing the different parts of the tug assembly as they are connected to receive electromotive power. The pulley 700 receives power via a belt and idlers, as shown. The rotation of the pulleys 700 causes rotation of a friction wheel 720 that is adapted to press against the bottom of the extrusion. The wheels 725, 730 hold against the top of the extrusion.

Figure 8:
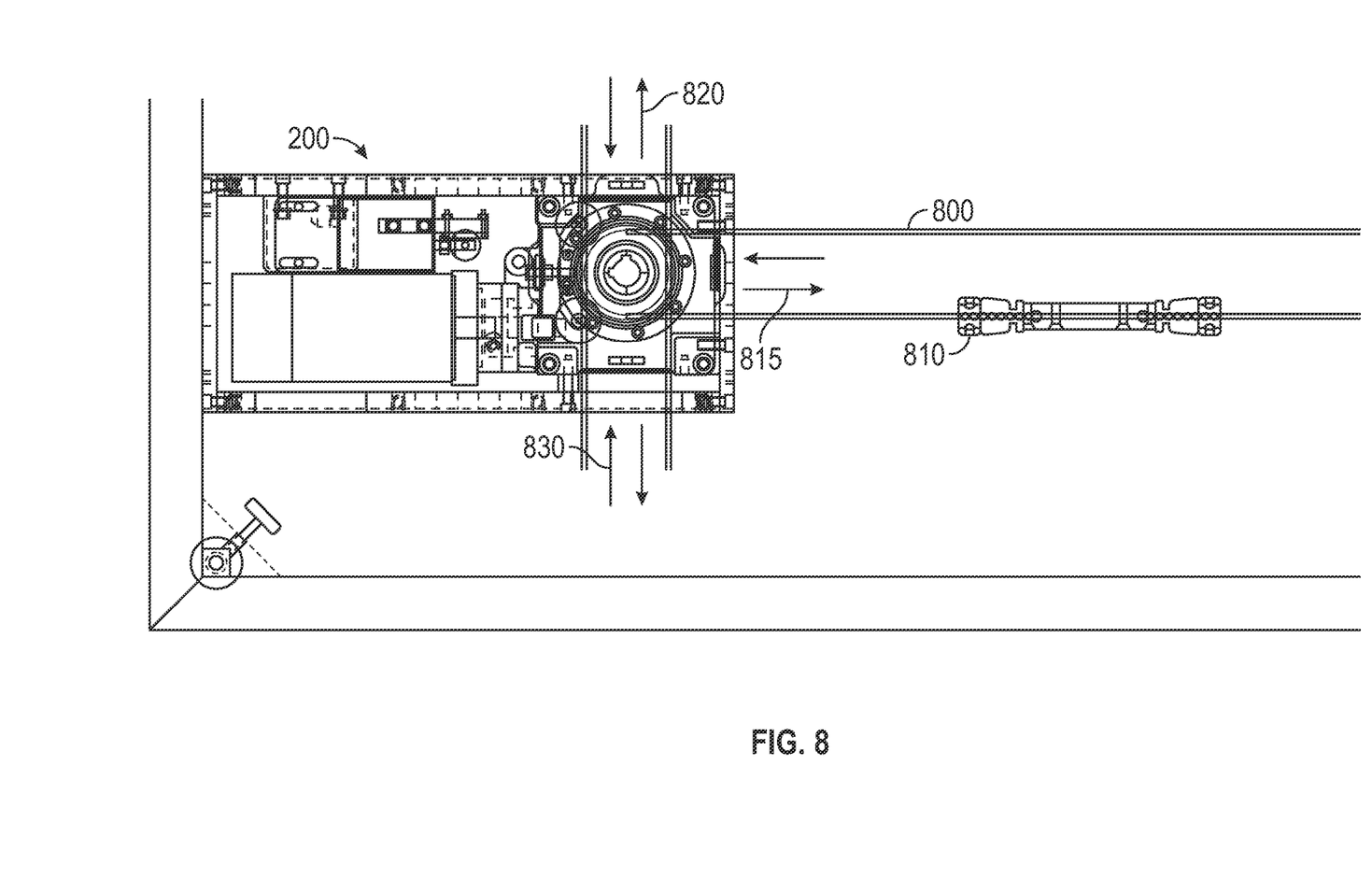
FIGS. 8 and 11 show a second embodiment in which the powerpack is used in a track within the deck.

An alternative assembly shown in FIG. 8 uses the PTO module to drive a track. This can be used for example in a deck platform, where the PTO module 200 travels permanently in the deck platform with a belt loop 800 shown. The track dog 810 is held within the track in the deck, and moves based on the movement of the PTO power plant. Note that while the belt is shown in this embodiment following the arrows 815, the belt can alternatively be located to follow the arrows 820, or to follow the arrows 830. That is, the belt can exist on any of the three sides of the PTO module.

Figure 11:
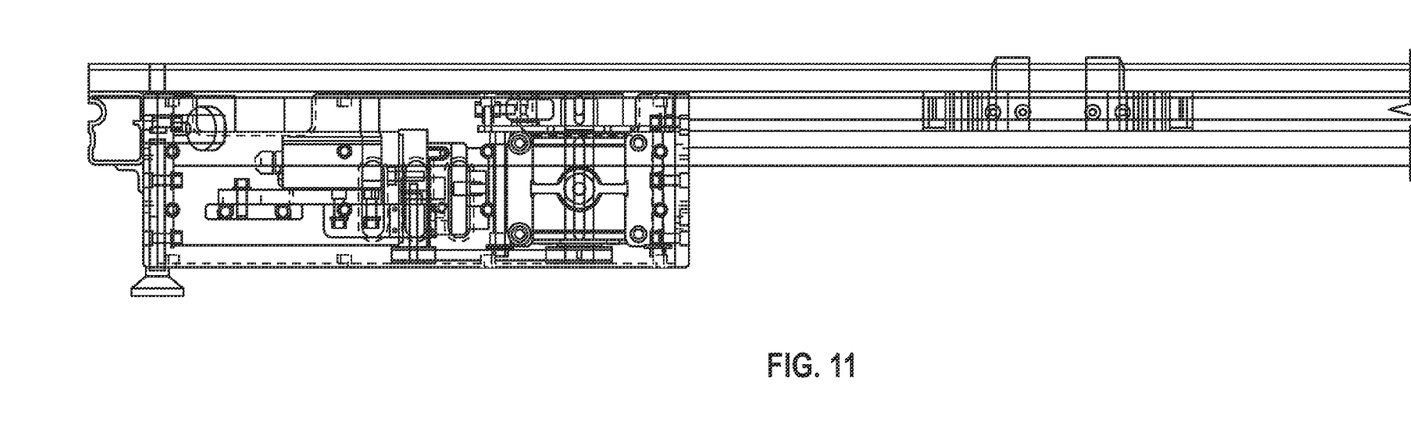

FIG. 11 shows a top view of the FIG. 8 embodiment, showing how the module is moved along the track.

Figure 9:
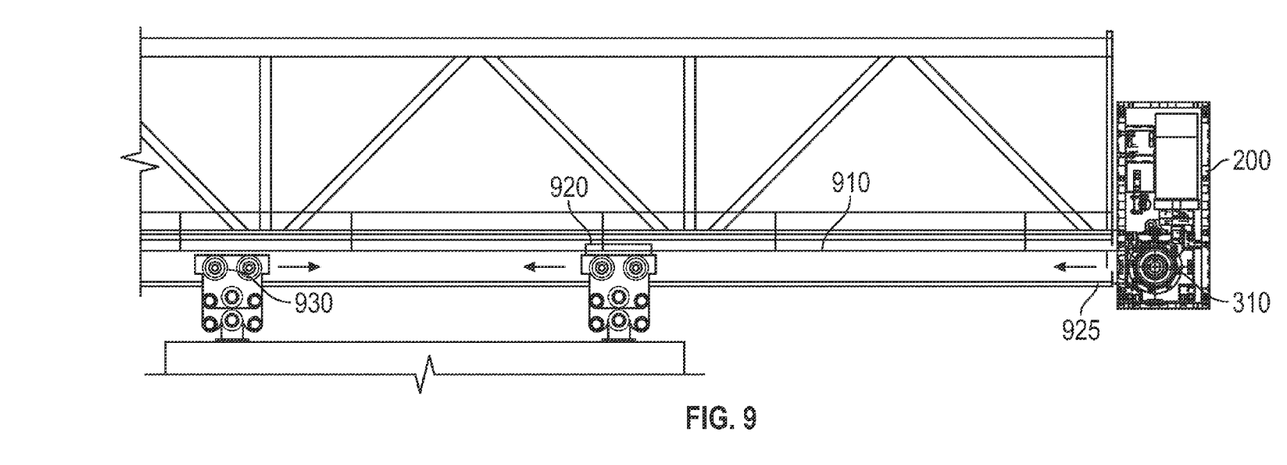
FIGS. 9 and 10 showing embodiment in which the powerpack is used in a truss to move an item along the truss while the powerpack stays stationary.
Figure 10:
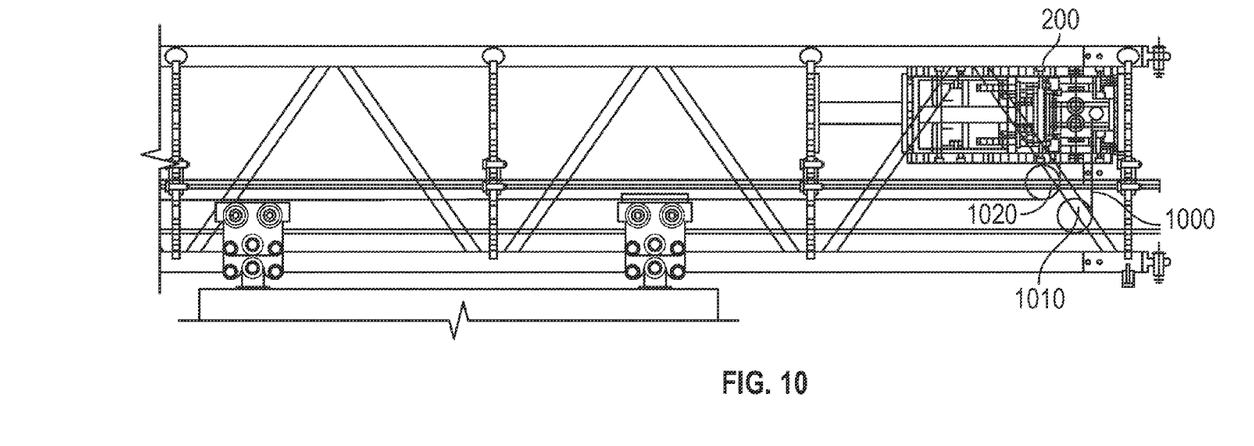

In alternative embodiments, shown in FIGS. 9 and 10, the power pack here shown as 200 is permanently installed and fixed, and also drives a belt or chain loop 910 using similar trolleys to those described above. The driving output 310 in this case moves the belt to thereby move the trolleys 920, 930 which are located on the belt. In this embodiment, the trolley 920 can be connected to one side of the loop while the trolleys 930 are connected to the other side of the loop, as shown, so that trolley 920 may move to the left in the figure while trolley 930 moves to the right. The belt can come out of the power pack at different angles. In FIG. 9 the belt comes out of the power pack at a 90° angle shown as 925, while in in the embodiment in FIG. 10, the belt also comes out at a 90° angle shown as 1000, but passes over idlers 1010, 1020 before passing in the appropriate direction.

Figure 12:
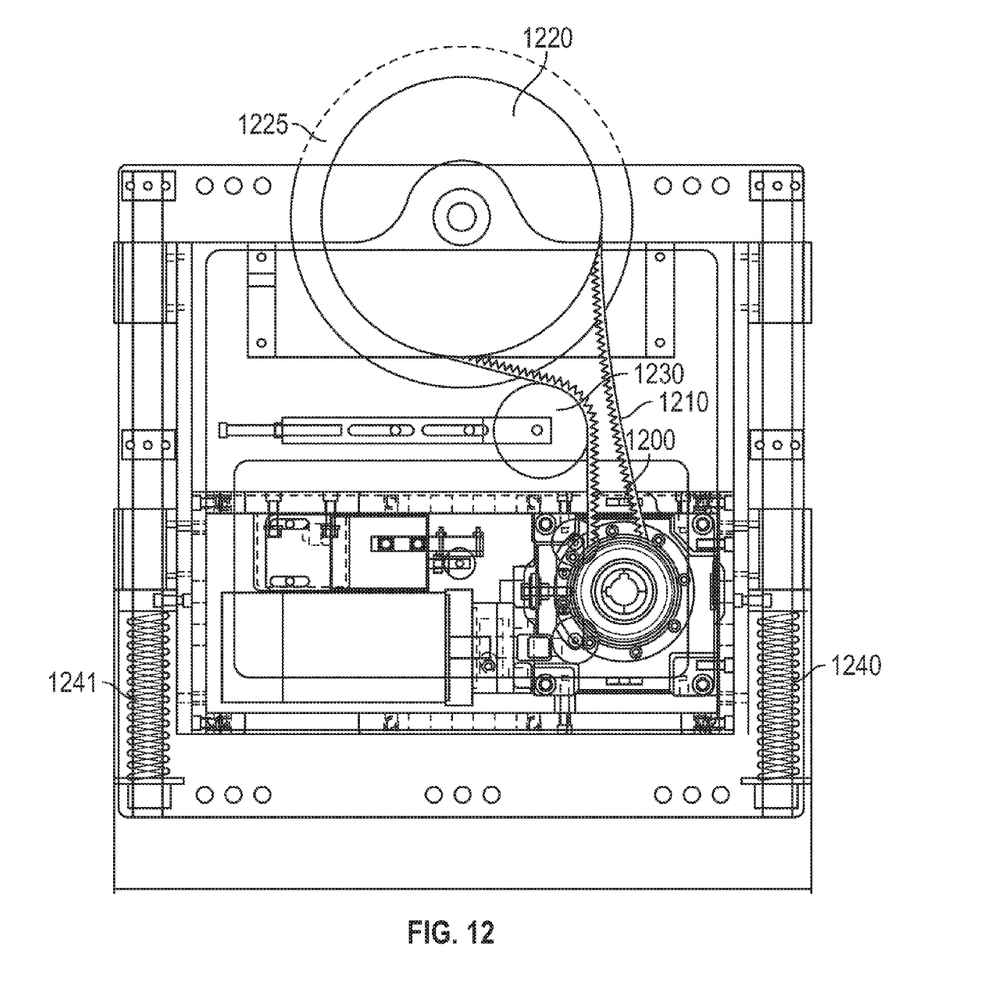
FIG. 12 shows an embodiment where the powerpack is used to move the turntable.

FIG. 12 shows the power pack 1200 configured into a turntable drive, where a drive belt 1210 passes between the driving device and a Pulley wheel 1220 associated with the turntable 1225. The turntable 1225 can be a rubber wheel that can be attached to the pulley 1220, for example. The belt 1210 can pass over an idler 1230 they can be adjustable to set the tension on the belt. There can also be compression springs 1240 1241 that additionally assist in setting the tension on the belt.

Figure 13:
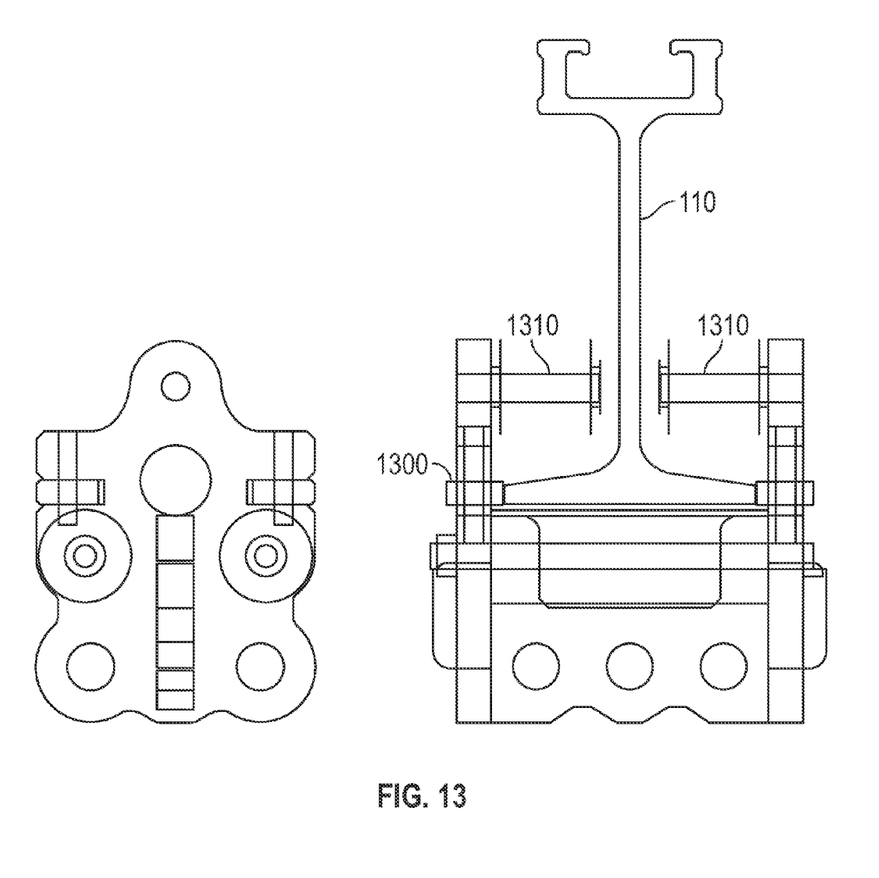
FIG. 13 shows details of how the trolley can fit on an I beam style extrusion.

FIG. 13 illustrates the mini trolley assembly 1300 that can be attached to the extrusion track 110. In this embodiment, there can be wheels 1310, 1311 that drive on the surface of the extrusion track, which can be attached to or driven by the main device.

Figure 14:
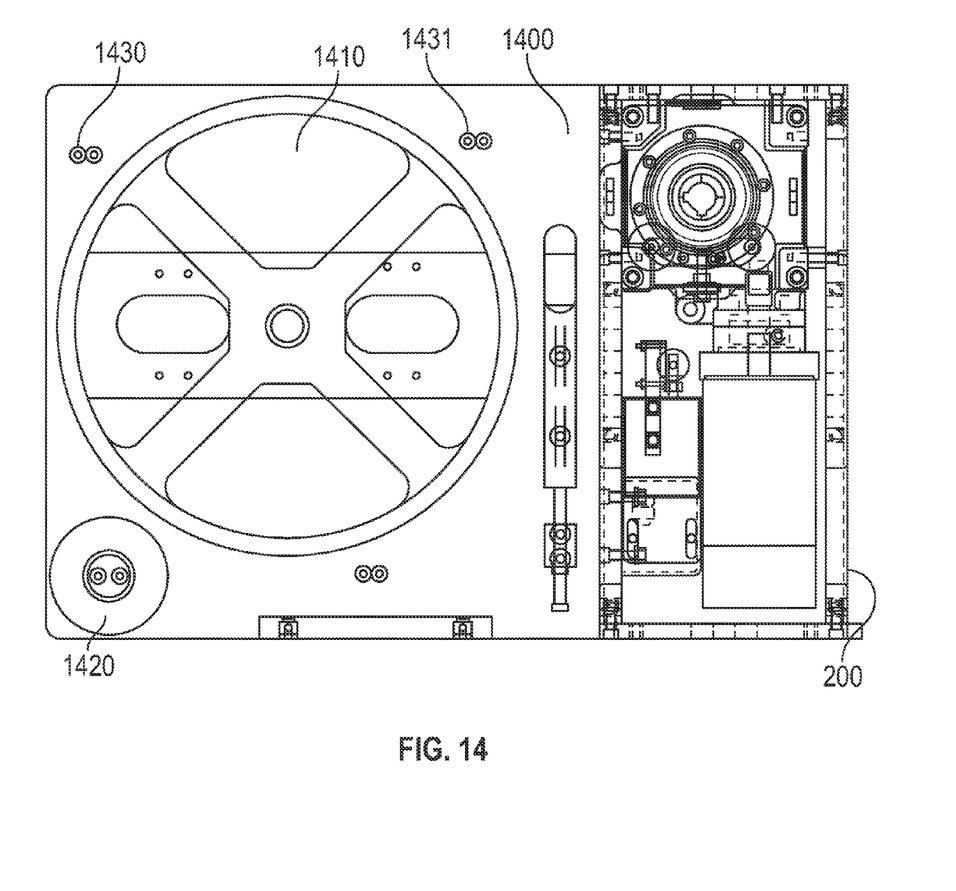
FIGS. 14 and 15 show details of the configuration of the powerpack.

In one embodiment, shown in FIG. 14, the base unit 200 is connected via a belt 1400 to a grooved drum, by connecting to a pulley 1410 via the belt 1400 using idlers. In this embodiment, there may also be sheaves such as 1420 and keeper rollers such as 1430, 1431.

Figure 15:
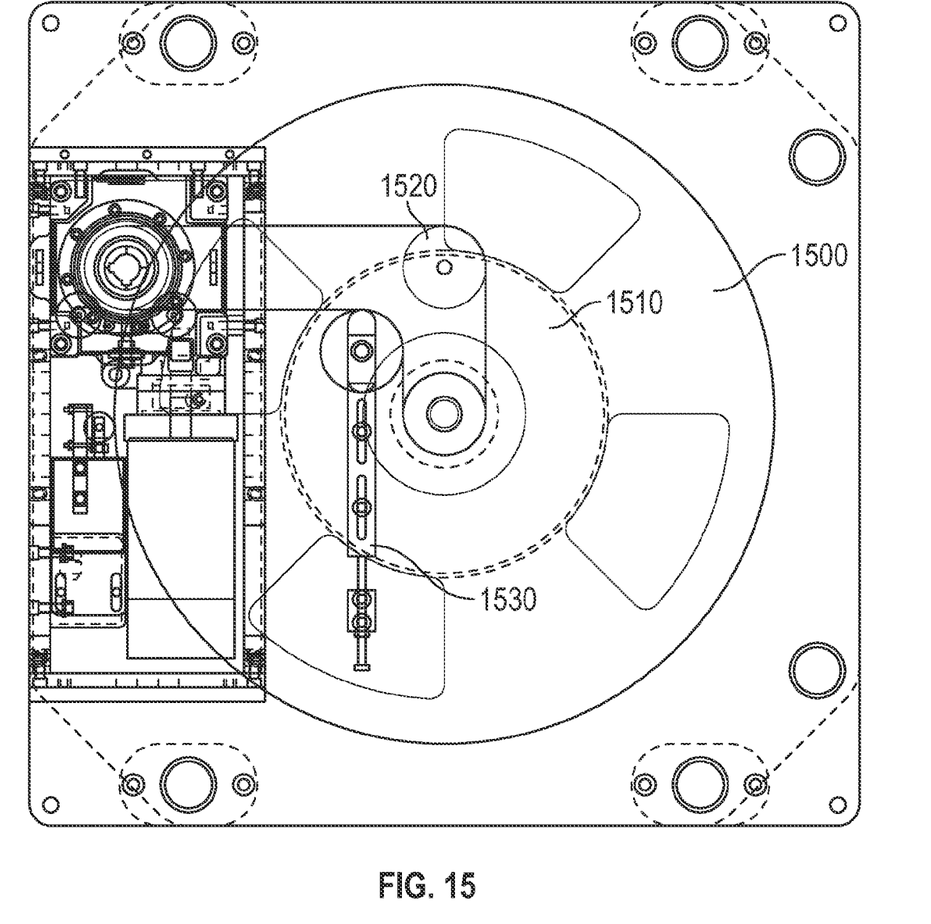

FIG. 15 shows an alternative embodiment, in which there is a Roller Located Closer to the Drive Element, the Roller 1500 Driven through Its Inner Pulley 1510 Via Belt Idlers 1520. A Belt Tension or 1530 Can Maintain Sufficient Tension on the Belt.

Although only a few embodiments have been disclosed in detail above, other embodiments are possible and the inventors intend these to be encompassed within this specification. The specification describes specific examples to accomplish a more general goal that may be accomplished in another way.

This disclosure is intended to be exemplary, and the claims are intended to cover any modification or alternative which might be predictable to a person having ordinary skill in the art. For example other devices can be similarly attached to the power pack.

Also, the inventors intend that only those claims which use the words "means for" are intended to be interpreted under 35 USC 112, sixth paragraph. Moreover, no limitations from the specification are intended to be read into any claims, unless those limitations are expressly included in the claims. Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A device comprising:
   a power pack, that produces rotational power, said power pack having a rectangular housing, and having a motor mounted at one end of said rectangular housing, and having a rotating output device mounted on the other end of said rectangular housing, said housing operable for being mounted:
   in a first configuration with said motor facing downward and in which said housing is energized to move along a substantially horizontal extrusion in a first configuration, and
   in a second configuration where said housing is moved along a track in a deck in a second configuration, and
   in a third configuration in which said housing is fixed, and causes a belt to be moved along a support.

2. The device as in claim 1, where said first configuration moves the housing along a first beam that is shaped like an I beam.

3. The device as in claim 2, further comprising a first trolley device attached to said power pack, for moving the housing along the first beam, said first trolley device including spaced wheels which go both above and below the first beam, and a drive part which drives said spaced wheels.

4. The device as in claim 1, wherein said second configuration connects to a belt.

5. The device as in claim 1, wherein said third configuration attaches the housing to a truss, and moves a remote device relative to said truss.

6. A device comprising:
   a power pack, that produces rotational power, said power pack having a rectangular housing, and having a motor mounted at one end of said rectangular housing, and having a rotating output device mounted on the other end of said rectangular housing, said housing operable for being mounted in both of a first configuration and a second configuration,
   and in which said housing is energized to move along a substantially horizontal extrusion in said first configuration with a long axis of the housing facing vertically, and the motor facing downward; and is energized to move along a track in a second configuration with the long axis of the housing facing vertically, and the motor facing downward vertically.

7. The device as in claim 6, wherein said housing is also operable for being mounted in a third configuration in a third configuration in which said housing is fixed, and causes a belt to be moved along a support.

* * * * *